United States Patent Office 3,582,380
Patented June 1, 1971

3,582,380
PIGMENT COMPOSITIONS
Alexander Hamilton, 63 Whitton Drive,
Giffnock, Glasgow, Scotland
No Drawing. Filed July 19, 1968, Ser. No. 745,981
Claims priority, application Great Britain, July 21, 1967,
33,537/67
Int. Cl. C08h 17/00, 17/02
U.S. Cl. 106—288Q                                   17 Claims

ABSTRACT OF THE DISCLOSURE

Pigment compositions readily dispersible in organic media such as printing ink media and alkyd paint media are disclosed as comprising a pigment and a salt of a dialkyl-sulphosuccinic acid and a non-alkali metal selected from certain groups of the Periodic Table of Elements other than Group Ia thereof. The production of the novel compositions from pigment, alkali metal or ammonium dialkyl-sulphosuccinate and a water-soluble salt of the aforesaid non-alkali metal is also described.

DETAILED DISCLOSURE

The present invention relates to the treatment of pigments, and more especially to novel pigment compositions which disperse more readily than conventional pigments into the organic media which are used as the basis of printing inks or paints; the invention also relates to the production of these novel pigment compositions.

Usually, when making a liquid printing ink, it is necessary to incorporate the pigment into the ink medium by grinding for up to 24 hours in a ball-mill to achieve full dispersion and therefore full color value from the pigment. When using a pigment composition according to the present invention, the pigment can be dispersed into the medium by high-speed stirring on cavitation mixers such as a Torrance High Speed Cavitation Disperser or a Cowles Dissolver, the dispersing action of which is effected by high-speed rotation of a toothed disc in the mixture as described, e.g. in U.S. Pat. No. 3,296,001, and the time required to achieve full dispersion is approximately 15 to 30 minutes, depending upon the particular conditions chosen, such as solids percentage present in the medium, solvent blend used and position of the dispersion head in the dispersion vessel.

It is also known that pigment prepartions may be dispersed by high-speed stirring on cavitation mixers, but this involves incorporating the pigment in fairly large amounts of resins. In this process, dry pigment powder is incorporated in a molten resin on a heavy-duty mixer, such as a Cox Dual-Mix Baker-Perkins mixed, which breaks down the pigment aggregates with tremendous shearing forces into primary pigment particles and sheathes each of these particles in resin. The resulting mixture of pigment and resin which normally contains approximately equal parts of each component may be dispersed by stirring into any medium which contains a solvent which will dissolve the resin and release the pigment particles. Such products have the disadvantages in that they involve a further costly production process for the pigment treatment, and that the pigment is diluted to a great extent with a resin which may, in some cases, not be compatible with certain constituents such as another resin in the substrate which is to be pigmented, thus leading to poor properties in the final ink or print. Alternatively, addition of such a diluting resin can cause an increase in viscosity which is not usually welcome.

In contrast, the process of the present invention can be carried out as an additional stage during pigment manufacture, and does not involve any great increase in cost, and the novel pigment compositions obtained thereby are free from the above-explained drawbacks.

According to the present invention there is provided a process for treating an aqueous slurry of pigment with a solution of a water-soluble salt of a non-alkali metal, namely a metal selected from the metals of Group 1b, Groups 2a and 2b, of Group 3 aluminum, the lanthanides, Group 4a, Group 5a, Group 6a, Group 7a and of Group 8 iron, cobalt and nickel, said Groups being those of the Periodic Table of Elements published in Römpp's "Chemie Lexikon" III, page 4754 (1966), and a solution of a water-soluble salt of a dialkyl sulphosuccinic acid whereby the metallic salt of the dialkyl sulphosuccinic acid is precipitated onto the pigment.

The resulting pigment composition is preferably filtered, washed and dried in any manner conventionally used for untreated pigments.

The process of the present invention is particularly valuable for the treatment of organic pigments. Organic pigments that may be used are, for instance, Pigment Red 57 (C.I. No. 15850), Pigment Red 12 (C.I. No. 12385), Pigment Orange 5 (C.I. No. 12075) and Pigment Red 48 (C.I. No. 15865). The pigment to be treated is preferably in the form of an aqueous slurry, for instance an aqueous slurry or filter cake obtained during manufacture, which may contain the pigment in a wide range of concentrations but preferably contains between 1 and 10 parts by weight of pigment in 100 parts by weight of slurry.

The metallic salt that is used may be an inorganic or an organic salt and metals which may conveniently be used are, for instance, magnesium, calcium, strontium, barium, aluminum, titanium vanadium manganese iron cobalt, nickel, copper, zinc, cadmium, zirconium cerium, lanthanum, chromium. Suitable inorganic salts are for instance the chloride, sulphate or nitrate. Suitable organic salts are, for instance, the acetates of these metals.

Aluminum salts, especially aluminum chloride and aluminum sulphate are most preferred as metallic salts in the process according to the invention.

Dialkyl sulphosuccinic acid salts suitable for use in the process of the invention are, for instance, the potassium or ammonium salt but the sodium salt is particularly desirable. Each alkyl radical in these salts may be the same or different and may be of straight or branched chain and preferably contains from 4 to at most 12, and optimally 8 or 9 carbon atoms per molecule. Dialkyl sulphosuccinic acid salts that may conveniently be used are, for instance, potassium dibutyl sulphosuccinate, ammonium didecyl sulphosuccinate, sodium dioctyl sulphosuccinate, sodium diheptyl sulphosuccinate, sodium dinonyl sulphosuccinate, sodium bis-(tridecyl) sulphosuccinate, sodium dihexyl sulphosuccinate, potassium didodecyl sulphosuccinate and sodium diamyl sulphosuccinate.

The amount of metallic salt used is conveniently in the range of from 0.5% to 20% by weight based on the weight of pigment, and more preferably in the range of from 1% to 10% by weight based on the weight of pigment. The amount of the dialkyl sulphosuccinate salt used is conveniently in the range of from 2% to 30% by weight based on the weight of pigment and more preferably in the range of from 5% to 15% by weight based on the weight of pigment.

The ratio of equivalents of metal salt, especially of aluminium salt to equivalents of sodium dialkyl sulphosuccinate should be preferably in the range of from about 1:1 to 4:1.

The metallic salt and the dialkyl sulphosuccinate salt may conveniently be dissolved in water to make up the solutions and a wide range of concentrations may be used. Solutions of each salt containing between 0.1 and 10 parts by weight of salt to 100 parts by weight of water are preferred, the proportion of 1 to 5 parts by weight of salt to 100 parts by weight of water being particularly preferred.

The treatment of the pigment may be effected under a variety of conditions. The time during which the treatment takes place depends on the nature of the pigment and of the salt in order to secure the optimal improvement in pigmentary properties and may be, for instance, between 5 minutes and 1 hour. The temperature may also vary within a wide range and may be, for instance, between ambient, i.e. about 20° C., and 100° C. The treatment is advantageously carried out when the mixture is stirred, for instance, using a paddle type stirrer at speeds between 40 and 300 revolutions per minute, or by using a high-speed stirrer.

When pigment compositions containing a lake as pigment are to be produced, the optimal mode of carrying out the process of the invention in practice comprises first suspending the lake-forming dyestuff, e.g. in the form of its sodium salt, in water, adding an aqueous solution of the sodium salt of a high acid-value resin, e.g. gum rosin, then adding the lake-former, e.g. calcium chloride, to the resulting dyestuff solution or suspension, and thereafter adding first the dialkyl-sulphosuccinate solution and then the non-alkali metal salt solution, or more advantageously first the latter and then the former solution, whereupon the resulting slurry is heated and the resulting precipitated pigment composition separated by filtration, washed free of soluble impurities and dried.

The pigment lake-containing compositions according to the invention thus obtained are distinguished by particularly superior dispersibility in certain organic media as described more in detail hereinafter.

The pigment composition obtained according to the process of the present invention may contain between 5% and 50% by weight of additive but preferably between 7% and 20% by weight based on the weight of pigment, especially when a resinate is also present in the compositions.

The aforesaid dispersibility-enhancing additive consists essentially of the salt of a non-alkali metal and a di-alkyl-sulphosuccinic acid as defined above which is either a neutral salt or, for instance, in the case of aluminum as non-alkali metal, contains as major portion, e.g. 40 to 70%, of the basic salt, e.g. monohydroxy aluminum bis-(di-lower alkyl-sulphosuccinate), or similar basic, and preferably only monobasic salts of other polyvalent metals falling under the class of suitable nonalkali metals defined above in admixture with minor proportions of the neutral dialkyl sulphosuccinates.

The pigment compositions according to the invention may further contain a resinate, in an amount of up to 25% by weight; in particular, alkaline earth metal or aluminum resinates are used for this purpose.

The pigment content in these compositions preferably ranges from about 50 to 90% by weight.

These pigment compositions according to the invention show the same color value as the untreated pigments, but show much improved ease of dispersibility, compared with untreated pigments or with known pigment compositions prepared from pigment and sodium dialkyl sulphosuccinate without the use of non-alkali metal salts as defined, in certain liquid organic media such as, especially, publication gravure ink media or decorative alkyd paint media. The known pigment compositions containing sodium dialkyl sulphosuccinate show improved dispersibility in water but not in the aforesaid organic media.

Publication gravure ink media are made, for instance, by dissolving zinc resinate or calcium resinate or a mixed zinc/calcium resinate in a solvent comprising mainly hydrocarbon. The metallic resinates are preferably the salts of natural wood resin and the hydrocarbon solvent may be a mixture of toluene and a petroleum spirit, for instance. Special Boiling Point Spirit No. 5 which is a benzine boiling in the range of from 90 to 105° C. The ratio of aliphatic to aromatic constituents in these solvents depends on the solubility of the particular resin used.

Decorative alkyd paint media are air-drying paints and are usually solutions of long oil-modified alkyd resins in white spirit.

The following examples further illustrate the present invention. Parts by weight shown therein bear the same relation to parts by volume as do kilograms to litres. Percentages are expressed by weight unless otherwise stated. C. I. means Colour Index, Second Edition, 1956, published by The Society of Dyers and Colourists, Bradford, England and The American Association of Textile Chemists and Colorists, Lowell, Mass., U.S.A.

EXAMPLE 1

To 1000 parts of stirred aqueous slurry of Pigment Red 57 (C.I. No. 15850), calcium lake containing 51.5 parts of pigment and having a pH of about 6.8 to 7, were added 1.5 parts of aluminum chloride dissolved in 40 parts of water. Then a neutral solution containing 5.25 parts of sodium dinonyl sulphosuccinate having the formula

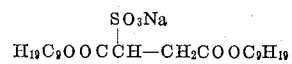

in 500 parts of water was run in. The treated slurry was heated to 55° C. over 10 minutes with stirring, and the pigment was then isolated by filtering and washing free of soluble impurities with cold water, and dried at 70–75° C.

A portion of pigment was isolated from the slurry in the same way omitting the addition of aluminum chloride and sodium dinonyl sulphosuccinate.

The two products were compared by incorporation in a commercial gravure printing ink medium, comprising 52% of zinc/calcium resinate, 9.6% of toluene and 38.4% of benzine (e.g. Special Boiling Point Spirit No. 5), using a Torrance Cavitation Disperser at 20% pigmentation, i.e. every 100 parts by weight of the final ink contains 20 parts by weight of pigment.

These inks were compared with an ink made on a ball-mill from the same pigment, a conventional laboratory ball-mill being used.

This is a cylindrical porcelain pot and it was charged with the printing ink medium, the pigment, and the steatite (porcelain) balls used for grinding. The pot was then rotated on rollers at such a speed that the balls cascade through the medium and grind the pigment. The time of grinding was 24 hours. The ink made from the treated pigment was equal in strength coloristically to the ball-milled standard, and showed an adequate degree of dispersion with a value of 7–8 on the Hegmen Grinding Gauge. The ink made from the untreated pigment was coloristically weak compared to the ball-milled standard, and showed a very poor degree of dispersion with particles showing along the full length of the Hegman Grinding Gauge.

The aluminum chloride may be replaced by an equivalent amount of ferric chloride or chromic sulphate or nickel nitrate to give in each case a product showing an equal case of dispersibility to that obtained when using aluminum chloride.

EXAMPLE 2

An aqueous filter cake containing 42.8 parts dry weight of Pigment Red 12 (C.I. No. 12385) was resuspended by stirring with 428 parts of water and a solution of 1.5 parts of aluminum chloride in 30 parts of water was added. After stirring for 15 minutes at 20° C. a neutral solution containing 5.1 parts of sodium dinonyl sulphosuccinate in 500 parts of water was run in. After stirring for a further 15 minutes the treated pigment was isolated by filtering, washing free of water-soluble impurities and drying at 50° C.

A portion of the same filtercake was treated similarly except that the additions of aluminum chloride and sodium dinonyl sulphosuccinate were omitted.

The treated and untreated products were compared by incorporating each into a decorative alkyd paint medium comprising 70% soya bean oil-modified pentaerythritol alkyd resin and 30% white spirit using a cavitation disperser under exactly similar conditions. The treated pigment dispersed fully in 30 minutes to give a paint equal in colour strength to one made from untreated pigment using a ball-mill. The untreated material did not disperse satisfactorily, undispersed particles showing along the full length of the Hegman Grinding Gauge (see A.S.T.M.C. 1210–54) after 30 minutes.

EXAMPLE 3

An aqueous filtercake containing 43.5 parts dry weight of Pigment Orange 5 (C.I. No. 12075) was resuspended by stirring in 2000 parts of water. A solution of 1.0 part aluminium chloride in 35 parts of water was added, and after stirring 10 minutes a neutral solution containing 4.9 parts of sodium dioctyl sulphosuccinate in 140 parts of water was run in. The treated pigment was filtered off, washed free of water-soluble impurities, and dried at 50° C.

The treated product was then compared with an untreated portion of the same pigment by incorporation into a decorative alkyd paint medium on a cavitation disperser. The treated pigment dispersed in 30 minutes to give a Hegman Gauge reading of 7, whereas the untreated portion still showed undispersed particles at Hegman Gauge 1 after 30 minutes.

EXAMPLE 4

A solution containing 2.0 parts of aluminium chloride in 40 parts of water was added with stirring to an aqueous slurry of 110.0 parts of Pigment Red 48 (C.I. No. 15865) calcium lake, in 1500 parts of water. After stirring for 10 minutes a neutral solution of 7.0 parts of sodium dinonyl sulphosuccinate in 700 parts of water was added over 15 minutes. The treated slurry was stirred for a further 15 minutes and the parts of water was added over 15 minutes. The treated slurry was stirred for a further 15 minutes and the pigment was then separated by filtration, washed free of soluble impurities with cold water and dried at 90–95° C.

The product could be dispersed completely in 30 minutes in a commecial zinc/calcium resinate gravure ink system using a simple stirrer. A pigment made by exactly the same process but omitting the after-treatment with aluminium chloride and sodium dinonyl sulphosuccinate was completely undispersible under the same conditions.

EXAMPLE 5

An aqueous suspension of Pigment Red 57 (C.I. No. 15850) calcium lake, was prepared by the addition of 85 parts of American WW Gun Rosin, dissolved as the sodium salt in 1700 parts of water, and 168 parts of calcium chloride dihydrate, dissolved in 1600 parts of water, to an aqueous suspension of 430.5 parts of Pigment Red 57 (C.I. No. 15850) sodium salt dyestuff in 7000 parts of water. 33.5 parts of aluminium sulphate (17%–18% $Al_2O_3$) dissolved in 335 parts of water was then added to the stirred pigment suspension, and after 10 minutes a neutral solution of 52.5 parts of sodium dinonyl sulphosuccinate in 5000 parts of water was added. After stirring for a further 15 minutes the slurry was heated to 55° C. and the treated pigment was isolated by filtration, washed free of soluble impurities with water and dried at 90–95° C.

The resulting pigment composition consists of about 75% of pigment lake
about 15% of American rosin, calcium salt, and
about 10% of aluminium dinonylsulphosuccinate, about 42.5% of which consists of the tri(dinonyl-sulphosuccinate and the balance of basic bis-(dinonylsulphosuccinate).

The product could be dispersed completely in a zinc/calcium resinate gravure ink system within 30 minutes using high-speed stirring equipment.

EXAMPLE 6

Using a process exactly as Example 5 but replacing the 33.5 parts of aluminum sulphate by 32.0 parts of cupric acetate monohydrate dissolved in 640 parts of water a product showing similar ease of dispersibility is obtained.

EXAMPLE 7

Using a process exactly as Example 5 but replacing the 33.5 parts of aluminium sulphate by 40.0 parts of nickel acetate tetrahydrate dissolved in 1000 parts of water a product showing similar ease of dispersibility is obtained.

EXAMPLE 8

Replacing the 33.5 parts of aluminium sulphate in Example 5 by 40.0 parts of barium chloride dihydrate or by 40.0 parts of magnesium sulphate heptahydrate or by 24.0 parts of strontium nitrate or by 32.0 parts of manganese chloride tetrahydrate gives in each case a pigment showing equal ease of dispersibility to that of Example 5.

Similar readily dispersible products are obtained when replacing, in each of the preceding Examples 1 to 5, aluminum chloride by an equivalent amount of (a) ferrous sulphate [$FeSO_4 \cdot 7H_2O$]
(b) ferric chloride [$FeCl_3 \cdot 6H_2O$]
(c) calcium bromide
(d) zinc nitrate
(e) cadmium sulphate [$3CdSO_4 \cdot 8H_2O$]
(f) lanthanum chloride [$LaCl_3 \cdot 7H_2O$]
(g) cerium chloride
(h) titanium tribromide [$TiBr_3 \cdot 6H_2O$]
(i) zirconium sulphate [$Zr(SO_4) \cdot 4H_2O$]
(j) vanadium tribromide
(k) chromium trichloride [$CrCl_3 \cdot 10H_2O$]
(l) cobaltous nitrate [$Co(NO_3)_2 \cdot 6H_2O$]

and/or when replacing the sulphosuccinate used in each of the preceding Examples 1 through 8 by (A) sodium bis-tridecyl) sulphosuccinate
(B) sodium dihexyl sulphosuccinate
(C) sodium diamyl sulphosuccinate
(D) potassium dibutyl sulphosuccinate
(E) ammonium didecyl sulphosuccinate
(F) potassium didodecyl sulphosuccinate
(G) sodium diheptyl sulphosuccinate.

I claim:

1. A pigment composition comprising
   (a) an organic pigment in a major amount up to about 95%,
   (b) about 5–50% of aluminium salt of a dialkylsulphosuccinic acid wherein each alkyl group has from 4 to 13 carbon atoms, said salt being completely neutral or containing a major portion of basic salt which has about one hydroxyl group per molecule, and
   (c) from 0 to about 25% of a resinate, all percentages being calculated based on the total weight of the composition.

2. A composition according to claim 1, wherein each alkyl group of the dialkyl-sulphosuccinate represents octyl or nonyl.

3. A pigment composition consisting essentially of
   (a) about 75% of organic pigment lake,
   (b) about 10% of aluminum dinonylsulphosuccinate and
   (c) about 15% of calcium salt of American rosin,
   all preceding percentages being calculated based on the total weight of the composition, about 42.5% of component b consisting essentially of aluminum tri-dinonylsulphosuccinate and the balance being hydroxy-aluminum bis-dinonylsulphosuccinate.

4. A process for producing a readily dispersible pigment composition comprising
(a) mixing with each other aqueous slurries of
(i) from 1 to 10 parts by weight of an organic pigment in 100 parts by weight of slurry,
(ii) a solution of from 0.5 to 20.0% by weight, based on the weight of the pigment, or a water-soluble salt of a non-alkali metal selected from the group consisting of aluminum, iron, cobalt, nickel, the lanthanides and the metals of Groups 1b, 2a, 2b, 4a, 5a, 6a and 7a of the Periodic Table of Elements, and
(iii) a solution of from 2 to 30% by weight, based on the weight of the pigment, of a water-soluble salt of a dialkyl-sulphosuccinic acid, wherein each alkyl group has at least 4 carbon atoms thereby reacting the salt defined under ii with salt defined under iii, and
(b) recovering the resulting dispersible pigment composition comprising the pigment and dialkyl-sulphosuccinate of the non-alkali metal from the reaction mixture.

5. A process according to claim 4, wherein each alkyl group of the dialkyl-sulphosuccinic acid has from 4 to 13 carbon atoms.

6. A process as described in claim 4, wherein said salt defined under (ii) is a water-soluble salt of a metal selected from copper, magnesium, calcium, strontium, barium, zinc, cadmium, aluminum, lanthanum, cerium, titanium, zirconium, vanadium, chromium, manganese, iron, colbalt and nickel.

7. A process as described in claim 4, wherein said salt as defined under (ii) is a chloride, sulphate, nitrate or acetate.

8. A process as described in claim 4, wherein the salt defined under (iii) is a sodium salt, potassium salt or ammonium salt of said dialkyl sulphosuccinic acid and solution (iii) is of approximately neutral pH.

9. A process as described in claim 8, wherein each alkyl of said dialkyl sulphosuccinic acid has from 4 to 13 carbon atoms.

10. A process as described in claim 9, wherein said salt defined under (iii) is selected from sodium dioctyl sulfosuccinate, sodium dinonyl sulphosuccinate, sodium bis(tridecyl) sulphosuccinate, sodium dihexyl sulphosuccinate and sodium diamyl sulphosuccinate.

11. A process as described in claim 4, wherein said salt defined under (ii) is added to the reaction mixture in an amount of from 0.5% to 20% by weight calculated on the weight of said pigment, and said salt defined under (iii) is added to said mixture in an amount of from about 2% to 30% by weight calculated on the weight of said pigment.

12. A process as described in claim 4, wherein said salt defined under (ii) is contained in said solution thereof in an amount of from about 0.1 to 10 parts by weight per 100 parts of water, and said salt defined under (iii) is contained in said solution thereof in an amount of from about 0.1 to 10 parts by weight per 100 parts of water.

13. A process as described in claim 4, wherein said step (a) is carried out with stirring for from about 5 to 60 minutes and at a temperature of from about 20° C. to 100° C.

14. A process as described in claim 4, wherein said pigment is the aqueous slurry of an organic pigment lake obtained by adding a lake-former to an aqueous slurry of a lake-forming dyestuff.

15. A process as described in claim 5, further comprising adding to said aqueous pigment lake slurry a resinate in sufficient amount to obtain in the final composition a resinate content of at most 25% calculated on the total weight of said final composition.

16. A process as defined in claim 5, wherein said solution (ii) is added to said aqueous pigment lake slurry before the addition thereto of said solution (iii).

17. A pigment composition as defined in claim 3, wherein said pigment lake is the calcium lake of Pigment Red 57.

References Cited
UNITED STATES PATENTS

| 2,675,320 | 4/1954 | Christopher et al. | 106—308OX |
| 2,172,505 | 9/1939 | Gardner | 106—308OX |
| 3,159,498 | 12/1964 | Davis et al. | 106—308O |

FOREIGN PATENTS

| 1,188,233 | 3/1965 | Germany | 106—288O |

TOBIAS E. LEVOW, Primary Examiner

H. M. S. SNEED, Assistant Examiner

U.S. Cl. X.R.

106—20, 22, 308Q, 309